United States Patent [19]

Shah et al.

[11] Patent Number: 5,777,034
[45] Date of Patent: Jul. 7, 1998

[54] METHACRYLATE RESIN BLENDS

[75] Inventors: Nilesh Shah; Manhua Lin, both of Maple Glen, Pa.

[73] Assignee: Rohm and Haas Company, Philadelphia, Pa.

[21] Appl. No.: 745,393

[22] Filed: Nov. 8, 1996

Related U.S. Application Data

[60] Provisional application No. 60/009,339 Dec. 28, 1995.

[51] Int. Cl.⁶ .......................... C08L 33/12; C08L 33/20; C08L 33/08; C08L 33/10
[52] U.S. Cl. .......................... 525/228; 525/80; 525/85; 525/222; 525/227; 525/228; 525/238
[58] Field of Search .................. 525/228, 222, 525/238

[56] References Cited

U.S. PATENT DOCUMENTS

| | | |
|---|---|---|
| 3,793,402 | 2/1974 | Owens. |
| 3,846,368 | 11/1974 | Pettit, Jr. |
| 3,957,921 | 5/1976 | Iwahashi. |
| 4,740,553 | 4/1988 | Maeda. |
| 4,774,291 | 9/1988 | Maeda. |
| 5,324,781 | 6/1994 | Date. |

*Primary Examiner*—Fred Zitomer
*Attorney, Agent, or Firm*—Guy Donatiello

[57] ABSTRACT

The invention encompasses a new methacrylate resin blend composition, and a method of making the blend composition, having improved solvent craze resistance. The new blend composition contains a methacrylate matrix resin, particles of a single layer polymer, and, optionally, an acrylic multi-layer polymer. Particles of the single layer polymer derived from 50% or more methyl methacrylate, and having weight average molecular weight (Mw) at least 120% of the Mw of the methacrylate matrix resin component of the blend, the particles having a diameter of from 50 to 500 nanometers, have been discovered to confer a solvent craze resistance value to the methacrylate resin blend which is at least twice the solvent craze resistance value of the methacrylate resin absent particles of the single layer polymer. Solvent craze resistance of the blend may be improved by as much as 10-fold or more over the solvent craze resistance of the methacrylate matrix resin alone.

10 Claims, No Drawings

METHACRYLATE RESIN BLENDS

This invention relates to a methacrylate resin blend composition having improved solvent craze resistance. More specifically, the methacrylate resin blend composition has improved solvent craze resistance which is achieved in a new way, simply and economically, while retaining the blend composition's desirable acrylic properties such as weather durability, molding and melt calendering capability, appearance, impact resistance and mechanical properties.

Methacrylate resins are widely used in producing sheet, molded parts and articles having known, desirable "acrylic properties" mentioned above. However, acrylic polymers generally, and methacrylate resins in particular, may deteriorate in appearance and physical properties when contacted with organic solvents such as alcohols, gasoline, paint thinners, and surface cleaning liquids. Improvement in the resistance of surface degradation by solvents, so-called "solvent craze resistance" or "craze resistance," has been the subject of considerable study in the art. Methacrylate resins, that is, polymers and copolymers derived from at least 50 weight % methyl methacrylate are widely commercially used; those resins which have been made by cell or continuous casting processes generally have excellent solvent craze resistance because of their very high molecular weights (typically exceeding one million daltons). But beyond the disadvantageous high cost of producing cell or cast methacrylate resins, these materials also are difficult to form into molded articles. A technical challenge to the art has been to produce methacrylate resins having good sheet-making and molding properties with retention of good physical properties while also achieving the excellent craze resistance of cast or cell sheet.

U.S. Pat. No. 5,324,781 ('781) discloses methacrylic-based resins containing certain types of multi-layered polymer particles which mixtures have improved solvent resistance. Unfortunately, the polymer particles of the '781 patent require at least two layers (i.e. they are of the "core/shell" type) to confer effective craze resistance to the blend. Specifically, the particles require an inner methacrylate layer of very high viscosity average molecular weight and an outer methacrylate layer having lower molecular weight. Particles with these requirements therefore have relatively complex and costly processing steps in their production.

The problem addressed by the present invention is to provide improved craze resistance to methacrylate resins by a simpler, lower cost method than by known methods. We have discovered that particles made of only a single layer of polymer of specified composition, molecular weight and particle size surprisingly confer improved craze resistance to a blend containing the so-defined single layer polymer (SLP) particles and a methacrylate matrix resin. Particle sizes of SLPs from 50 to 500 nanometers (nm) are effective in the inventive blend compositions and are preferably achieved by emulsion polymerization. Blends of the invention have equivalent or better craze resistance than known blends incorporating other polymers (e.g. the "other polymers" requiring at least two layers), and are at least two-fold, preferably five-fold, improved over the craze resistance of the methacrylate matrix resin alone. Thus, there is provided a methacrylate resin blend composition, comprising:

a) from 50 to 99 weight percent of a methacrylate matrix resin derived from monomer units comprising at least 50 weight percent methyl methacrylate and optionally up to 50 weight percent of at least one monoethylenically unsaturated monomer unit selected from the group consisting of $C_1$–$C_8$ alkyl acrylate, $C_2$–$C_4$ alkyl methacrylate, styrene, and acrylonitrile, the methacrylate matrix resin having a weight average molecular weight of at least 85,000 daltons; and b) from 1 to 50 weight percent of particles of a single layer polymer derived from monomer units comprising at least 50 weight percent methyl methacrylate and optionally up to 50 weight percent of at least one mono-ethylenically unsaturated monomer unit selected from the group consisting of $C_1$–$C_8$ alkyl acrylate, $C_2$–$C_4$ alkyl methacrylate, styrene, and acrylonitrile; the single layer polymer having a weight average molecular weight of at least 120% of the weight average molecular weight of the methacrylate matrix resin and the single layer polymer particles having a diameter of from 50 to 500 nanometers.

The methacrylate resin blend composition of the invention, as demonstrated by, for example, articles and sheet made from the blend, have a solvent craze resistance value improved by at least 2-fold, preferably 5-fold and more preferably 10-fold, over the solvent craze resistance value demonstrated by the articles or sheet made with the methacrylate matrix resin of the blend in the absence of the SLP. The improved craze resistance thus provides valuable increased resistance to solvents, for example organic solvents, washing detergents and cleaners, and related liquids, in contact with the articles and sheet made from the inventive blends.

DETAILED DESCRIPTION OF THE INVENTION

By "single layer polymer" ("SLP") is meant a polymer consisting of only one "layer" or "stage" (as will be described). The SLP preferably is prepared by emulsion polymerization and has the composition defined herein. Suspension polymerization and continuous polymerization methods also may be used to prepare the SLP. However, it is characteristic of the SLP of the invention that the SLP requires no additional processing to "coat" the layer, or to add to the single layer one or more additional layer, or "stage" (a term commonly used in the production of a multi-layer polymer, the "stage" referring to a separate layer, or additional polymer coating, on an underlying layer), nor to require any additional reaction or polymerization of another monomer or monomer combination in the presence of the SLP so as to provide any additional "layer" on the SLP.

As used herein, the term "molecular weight" means weight average molecular weight (Mw) unless otherwise indicated. Molecular weights, both Mw and number average molecular weight, Mn, were estimated by conventional gel permeation chromotographic (GPC) methods, using poly (MMA) calibration standards. The term used in defining the resin (or polymer) compositions of the blend: "derived from monomer units comprising at least 50% MMA," means that a monomer mixture comprising at least 50% MMA is polymerized by conventional free radical polymerization at the carbon-carbon double bond of MMA and other unsaturated monomer present to form the resin (or polymer) as defined. The term "dalton" means atomic mass unit.

The particles of the single layer polymer or copolymer used in making the blends of the invention have relatively high molecular weight, that is, a weight average molecular weight which is at least 20% larger than the Mw of the methacrylic matrix resin. Preferably the SLP Mw is more than 50% larger, and more preferably 100% or more than the Mw of the methacrylic matrix resin. In absolute terms, typical Mw ranges for effective SLPs are from 105,000 to 2,000,000 daltons, preferably from 120,000 to 1,000,000 daltons, and more preferably from 170,000 to 800,000 daltons.

The preparation of SLP particles is carried out preferably by emulsion polymerization using known techniques and, of course, requiring only a single stage, as described herein. By this method, the product of the single stage polymerization comprises a latex, that is, an aqueous composition containing dispersed therein the single layered polymer particles, from which the SLP particles of specified size (as measured by their diameter) may be isolated by conventional means for use in blending. Alternately, the SLP latex may be directly blended into other latices containing other components of the inventive blend, and the latex blend then isolated by conventional means, such as by spray drying or coagulation.

Composition of the SLP, and also of the methacrylate matrix resin, comprises a polymer or copolymer derived from 50 to 100% MMA. MMA levels from 50 to 75%, particularly with styrene as comonomer, may find useful injection molded applications, but most blends have more than 75% MMA and preferred blends have methacrylate matrix resin and SLP compositions derived from at least 85 wt. % MMA. Glass transition temperature (Tg) of blend compositions typically range from 50° to 120° C.; the preferred compositions, those having more than 85% MMA, typically have a Tg of at least 85° C. Monomers of the alkyl acrylic or alkyl methacrylic ("alkyl (meth)acrylic") esters having alkyl groups containing up to 18 carbon atoms may be incorporated into the SLPs of the invention, but preferred, due to their cost, performance, and availability, are those alkyl (meth)acrylic esters having alkyl groups with up to 8 carbon atoms. A more preferred composition of both the SLP and independently the methacrylate matrix resin is derived from at least 90 wt. % MMA and at least one alkyl acrylate or alkyl methacrylate selected from methyl acrylate, ethyl acrylate, and butyl acrylate, and butyl methacrylate.

Furthermore, the blends may comprise the methacrylic matrix resin, the single layer particles, and particles of one or more acrylic multi-layer polymer, the latter particles included in the blend to improve, for example, impact resistance or other blend properties, described more fully below.

The inventive blends typically are prepared by mixing pellets of matrix resin with the SLP in powder form (typically obtained by spray drying a SLP emulsion polymer); by mixing pellets of matrix resin with SLP pellets; by mixing pellets of matrix resin with SLP powder and an acrylic multi-layer polymer in powder form; or by mixing pellets of an impact-modified matrix resin with SLP powder or pellets. ("Pellets" are a form of polymer conventionally obtained by melt extruding, chopping the melt extruded strand into pieces, and cooling; the resulting pellets typically are of several millimeters diameter and up to several centimeters in length.) Processing of the mixtures just described, such as by melt-blending, typically may be carried out in a single- or twin-screw extruder at temperatures ranging from 150° to 300° C. The desired blend composition also can be formed by dispersing SLP particles as a powder into a monomer mixture constituting the composition of the matrix resin and polymerizing the monomer/SLP particle mixture by bulk or suspension polymerization. In the case of multi-layer polymer modified (i.e. impact modified) compositions, emulsion polymer latices of SLP and, for example, an acrylic multi-layer impact modifier polymer, may be mixed and the mixture isolated by spray-drying or coagulation and subsequently blended with the matrix polymer. Alternately, emulsion polymer latices of all three components (matrix resin, SLP, and an acrylic multi-layer polymer such as an impact modifier polymer) may be blended in emulsion form and the blended emulsion polymers isolated by conventional methods. The resulting powder is then typically processed by conventional melt blending and extrusion into pellets for further handling, such as in molding or melt calendering into sheet or by injection molding into molded articles.

Thus, there also is provided a method of improving the solvent craze resistance of a methacrylate matrix resin which is derived from monomer units of at least 50 weight percent methyl methacrylate and optionally up to 50 weight percent of at least one monoethylenically unsaturated monomer unit selected from the group consisting of $C_1$–$C_8$ alkyl acrylate, $C_2$–$C_4$ alkyl methacrylate, styrene, and acrylonitrile, the methacrylate matrix resin having a weight average molecular weight of at least 85,000 daltons. The method includes the following steps: a) adding to this methacrylate matrix resin the particles of a single layer polymer derived from monomer units comprising at least 50 weight percent methyl methacrylate and optionally up to 50 weight percent of at least one mono-ethylenically unsaturated monomer unit selected from the group consisting of $C_1$–$C_8$ alkyl acrylate, $C_2$–$C_4$ alkyl methacrylate, styrene, and acrylonitrile; the SLP particles added in an amount of from 1 to 50 weight percent based on the combined weight of the methacrylate matrix resin and the SLP particles, the SLP having a weight average molecular weight of at least 120% of the weight average molecular weight of the methacrylate matrix resin, and the SLP particles having a diameter of from 50 to 500 nanometers; and b) melt blending the methacrylate matrix resin containing the added SLP particles to form a blend of the SLP particles and matrix resin, wherein the blend has a solvent craze resistance value at least twice the solvent craze resistance value of the methacrylate matrix resin. (The solvent craze resistance would be "identically-measured," that is, a test for solvent craze resistance is carried out and measured on both the blend and the methacrylate matrix resin under identical conditions.)

Described earlier, the methacrylate matrix resin of the present invention comprises a copolymer prepared by polymerizing 50% or more of methyl methacrylate (MMA) and from 0 to 50% of, for example, one or more of a lower alkyl (i.e. a $C_1$–$C_8$ alkyl) acrylate. The $C_1$–$C_8$ alkyl includes, for example, methyl, ethyl, propyl, butyl, hexyl, octyl, and isomers thereof. While higher alkyl (meth)acrylic esters, i.e. those esters having alkyl up to $C_{18}$, may be used as comonomers with MMA, preferred alkyl (meth)acrylates include methyl acrylate (MA), ethyl acrylate (EA), and butyl acrylate (BA) or butyl methacrylate. More preferred is a copolymer matrix resin comprising at least 90 wt. % MMA with EA and/or BA comonomer. Of the acrylate comonomers, EA is most preferred. Thus, a highly preferred methacrylate matrix resin comprises, for example, a copolymer derived from 90 to 96% MMA and 4 to 10% EA.

Single layer polymers may have the same compositions and preferred ranges as those of the methacrylate matrix resins just described. A precise match of compositions is not required for achieving improved craze resistance in the blends of the invention. However, clear blends, i.e. those having transparency to visible light, would be made of refractive index-matched components by known methods; blends not requiring transparency would not require index-matched components. It is one of the surprising findings of the invention that just the simple incorporation of SLPs, as defined, into the methacrylate matrix resins as defined, provides the improvement in craze resistance described above. Particle size in the 50 to 500 nm range ensures that a portion of the SLP sufficiently interacts during melt processing with the methacrylate matrix resin. Mixtures of particle sizes of SLPs also may be used in making the blend. While larger particle sizes in certain compositional combinations may provide some degree of improvement in craze resistance, the critical range of from 50 to 500 nm particle size substantially ensures that craze resistance will be at least doubled in the blends of the invention.

While the Mw of the matrix polymer is at least 85,000 daltons, it preferably ranges from 85,000 to 220,000 daltons, and more preferably is from 85,000 to 160,000 daltons. Increasing the molecular weight of the methacrylate matrix resin polymer, all else being the same, increases the melt viscosity of the matrix polymer (thus decreasing the melt flow index) and the blend composition of which the matrix polymer is a part. Increasing the molecular weight also tends to improve the craze resistance of the blend. Matrix polymers within the preferred Mw ranges encompass an excellent combination of mechanical properties and flow behavior for molding and shaping articles from the inventive blends, particularly in injection molding processing. A highly preferred methacrylate matrix resin is within the range of from 85,000 to 120,000 daltons; a preferred effective SLP Mw for matrix resins in this range have Mw ranging from 105,000 to 1,000,000 daltons.

In general, the methacrylate matrix resin is a polymer or random copolymer which is advantageously prepared via free radical-catalyzed bulk polymerization of a mixture of the monomers, for example, in a continuous flow, stirred tank reactor, with an organic peroxide to about 50% conversion. The polymer-monomer mixture is pumped to a devolatilizing twin-screw extruder where residual monomer is removed and other additives can be added. The technique for conducting this polymerization is described in the literature and is known to those skilled in the art. The matrix resin polymer can be prepared also by bulk casting, emulsion, or suspension polymerization. The resulting polymer or random copolymer can be isolated by spray drying, or by coagulation, washing and known drying methods.

With respect to the aforementioned acrylic, multi-layer impact-modifier resin, it functions primarily to enhance the physical properties of the inventive blend, for example, in toughness and/or impact resistance. The preparation, blending and use of modifier resins of the type useful in the composition of this invention are well known. The preferred type of modifier resin for use in the practice of the present invention is described in, for example, U.S. Pat. No. 3,793,402 ('402). As described in the '402 patent, the modifier resin comprises multi-layered polymeric particles. Speaking generally, such resins are prepared by emulsion polymerizing a mixture of monomers in the presence of one or more previously formed polymeric stage, or layer. More specifically, such resins are prepared from monomers in aqueous dispersion or emulsion and in which successive monomeric charges are polymerized onto or in the presence of a preformed latex prepared by the polymerization of a prior monomer charge (forming a new stage, or layer). The polymeric product of each stage, or layer, can comprise a homopolymer or a copolymer. In this type of polymerization, the polymer of the succeeding layer is attached to and intimately associated with the polymer of the preceding layer, thus providing a "multi-layer" (or "multi-stage") polymer. The multi-layer particles can be recovered from the latex in which they are formed by spray drying or by coagulation and drying. Spray drying can be advantageously carried out in the presence of a "drying aid," for example, an acrylate-based resin which can be the same as or different from the methacrylate matrix resin described herein. The drying-aid resin should not affect adversely the chemical, physical, or aesthetic properties of the composition or articles made therefrom. A preferred drying-aid resin comprises, for example, a random copolymer of MMA and a ($C_1$ to $C_4$) alkyl acrylate and typically contains from 90 to about 99.9 wt. % MMA.

In great contrast to the impact-modifying polymers of the '402 patent and to the two layer polymers of the '781 patent, the single layer polymers of the present invention are prepared simply and at low cost and yet they surprisingly and significantly increase the solvent and chemical craze resistance of the blends in which they are present. Without being bound by any particular theory, it is believed that the SLP particles are uniformly distributed during melt blending within the uniform, continuous methacrylate matrix resin. The particles contribute some of their high molecular weight chains to the matrix polymer in the immediate vicinity of the particles while retaining their particle nature within the blend. The contributed chains in turn decrease the propensity of the matrix polymer to undergo the known phenomenon of "creep" in the presence of a solvent. Both craze initiation and propagation rates are thus retarded under these circumstances. The single layer polymer particles are surprisingly effective given that they do not contain or require a low-molecular weight outer layer to help disperse them in the matrix. This concept may apply to matrix polymers of all types in which low strain-rate behavior can be so affected by the addition of relatively small amounts (i.e. less than 50% of the resulting blend) of particles of a single layer polymer having molecular weight higher (by at least 20%) than the matrix polymer molecular weight.

As to the proportions of the matrix resin, an acrylic multi-layer impact modifier resin (if present), and the SLP particles of the present invention, it is generally noted that impact strength increases, but tensile strength and hardness decrease, with increasing impact modifier resin content and craze resistance increases with increasing single layer particle content. The matrix resin will comprise 50% to 99 wt. % , the impact modifier resin from 0 to about 50 wt. %, and the single layer polymer particles from 1 to 50 wt. % of the blend composition. If the blend has no multi-layer modifying resin present, a preferred range of matrix resin to SLP particles is from 60 to 98 wt. % and 2 to 40 wt. %, respectively; a more preferred range is from 80 to 95 wt. % and 5 to 20 wt. %, respectively. Within these latter preferred ratios of matrix resin and SLP, if an acrylic multi-layer modifier resin is employed, a preferred level of its use in the 60–98/2–40 blend is from 5 to 45 parts per hundred (pph), based on the weight of the matrix/SLP blend; when used in the more preferred ratio of 80–95 matrix polymer/5–20 SLP blend, a more preferred level of modifier use is from 10 to 40 pph, based on the weight of the matrix/SLP blend.

Optional ingredients that may be used in the composition of the present invention include, for example, color concentrates, for example, dyes and pigments, lubricants, UV stabilizers, thermal stabilizers, antioxidants, heat distortion temperature improvers, antistatic agents, physical or chemical blowing agents, nucleating agents, matting agents, flame retardants, and processing aids. In general, the total amount of such optional ingredients will generally not exceed about 5 wt. % of the composition weight. Additionally, fillers such as wood fibers, carbon fibers, glass fibers, glass beads, and minerals such as calcium carbonate, talc, titanium dioxide, barium sulfate, and the like optionally may be included in the composition of the present invention. The total amount of such optional fillers will generally not exceed about 20 wt. % of the composition weight.

The blends of the invention can be molded, such as extruded, melt-calendered, injection molded and otherwise formed into sheets or films or shaped articles using conventional equipment. Useful articles which can be so molded from the blend compositions have many uses and include, for example, sheet and molded products such as for outdoor signs; clear, tinted or opaque sheet for window glazing; automotive applications such as glazing and tail lights; appliances such as windows and partitions for watercraft and mobile homes; bathroom fixtures such as bathtubs, spas, faucet handles and similar fixtures; kitchen appliances such as microwave oven doors and refrigerator shelves; human and animal medical appliances such as incubators and cages. Such molded articles show improved resistance to solvent crazing over similar molded articles made from the matrix resin or matrix/acrylic multi-layer additives alone.

EXAMPLES

General Property Measurement
Solvent Resistance

The solvent craze resistance was measured by clamping an Izod bar to a fixture with a known curvature. The curvature chosen for the following examples caused the outer surface of the Izod bar to undergo a known constant strain, as indicated. A piece of filter paper was placed centrally on the bar and was kept wet with a test solvent. The time elapsed before the appearance of the first crazes on the surface of the Izod bar was recorded. The measurement was repeated several times (up to 5) and the time periods averaged.
Gel Permeation Chromatography (GPC)

Weight average molecular weight (Mw) was estimated by GPC using calibrated curves based on PMMA of known Mw. Correlation to Mv was not required but was capable of being established from GPC measurement and the Mark-Houwink equation.
Particle Size SLP Particle size was measured by dynamic light scattering and provided estimates of average particle diameter within 2%, based on calibrated standards. Within the blend, SLP particle size is determined either by scanning electron microscopy (SEM) or field emission SEM on the surface, or in a cross section, of a part made from the blend.
Tg Glass transition temperature (Tg) was measured by differential scanning calorimetry and was considered accurate within 3° C. Tg also was estimable within 5° C. using the Flory-Fox equation based on a known copolymer composition.
Abbreviations Abbreviations not already defined include the following: butyl methacrylate (BMA), comparative (comp.), Example (Ex.), weight (wt.), gram (g), percent (%); second (sec); nanometers (nm); greater than/less than (>/<). The terms "SLP" and "SLP Additive" are synonomous, both referring to the single layer polymer. All percentages are by wt. % unless otherwise indicated.

Example 1

Preparation of a Methacrylate Resin Blend having Improved Solvent Craze Resistance A. Preparation of methacrylate resin: A methacrylate resin was prepared from a monomer mixture consisting of 96.0% by weight of MMA and 4.0% by weight of EA, by a continuous bulk polymerization process, followed by extrusion to pellets. The weight average molecular weight of the resin was 111,000.

B. Preparation of a single layer polymer: Particles of a SLP were prepared using standard emulsion procedures in which a heel polymer was first prepared followed by gradual addition of the same monomer composition to the heel. Thus, to a 5-liter glass reactor equipped with a condenser, 1298.7 g. of deionized water was charged along with 0.53 g. of sodium carbonate; the mixture was heated to 82° C. while sparging with nitrogen and stirring at 180 rpm. After 1 hour, a heel charge of an emulsified mixture of 166.1 g. MMA, 6.9 g. EA, 0.025 g. di-tertiary dodecyl disulfide, 0.52 g. of sodium dodecyl benzene sulfonate, and 57.15 g. of deionized water was added to the reactor along with 0.21 g. of sodium persulfate. After an exotherm was complete, the reactor temperature was adjusted to 87° C. and 0.16 g. of sodium persulfate was charged to the reactor along with 45.0 g. deionized water. During 3.0 hours, an emulsified mixture of the same monomer composition as the heel was gradually added to the reactor, the charge containing 1494.72 g. MMA, 62.3 g. EA, 0.225 g. di-tertiary dodecyl disulfide, 4.68 g. sodium dodecyl benzene sulfonate, and 367.72 g. of deionized water. Over the same period of time, 0.66 g. of sodium persulfate was fed to the reactor along with 180.0 g. of de-ionized water. The reactor was cooled 30 minutes after the feeds were complete. Particles of the single layer polymer were isolated by spray drying and further characterized; average particle size was 278 nm and Mw was >600,000.

C. Preparation of a blend of A. and B. A methacrylic resin blend composition was made by first dry-blending 15 wt. %, based on the blend weight, of the SLP particles from Ex. 1 B. with 85 wt. % of the methacrylate resin, 1 A. The dry mixture was then melt compounded in a 2.5 cm vented, single-screw extruder at 230°–260° C. to produce pellets of the blend for injection molding. Izod bars were molded from the blend pellets at 260° C.

The solvent craze resistance was measured as described above on the Izod bars of this 85/15//methacrylic resin/single layer methacrylic polymer blend at 0.5% strain. Craze resistance was separately measured with two solvents, isopropanol/water (70/30 by wt.) and gasoline, and yielded the following times to craze: isopropanol/water, 692 sec; gasoline, 211 sec. The methacrylic resin from 1A, having no single layer polymer present, gave craze resistant times of only 56 and 21 seconds, respectively.

Example 2

Preparation of Additional Craze Resistant Blends

Additional blends of solvent-resistant formulations were prepared by dry-blending the materials from Example 1A and 1B in the ratios shown in Table 1 to provide Examples 2A (95/5) and 2B (90/10), respectively. The blends were melt-compounded, and Izod bars were prepared for evaluation, identically as described in Ex. 1 C. (Example 1 C, and the methacrylic resin of 1A having no single layer polymer present (Comparative Ex.), are included in Table 1.)

The data of Table 1 show measurably improved (at least two-fold) craze resistance in the blend having 5 and 10 wt. % SLP present (Examples 2A and 2B) and excellent (here, 10-fold) craze resistance improvement in Ex. 1C, having 15 wt. % SLP.

TABLE 1

Resistance to Isopropyl alcohol/Water (70/30 by Wt.) and gasoline (strain = 0.5%)

| Blend Example | Wt % of Example 1A Mw 110K | Wt % of Example 1B Mw > 600K | Seconds to craze in Isopropanol/ Water (70/30) | Seconds to craze in gasoline |
|---|---|---|---|---|
| 1A - Comp. Example; No SLP | 100.0 | 0 | 56 | 21 |
| 2A | 95.0 | 5.0 | 205 | 68 |
| 2B | 90.0 | 10.0 | 243 | 89 |
| 1C | 85.0 | 15.0 | 692 | 211 |

Example 3

Preparation of Effective Single Layer Polymer Additives for Methacrylate Resin Blends Having Improved Craze Resistance A. Preparation of a Single Layer Polymer of MMA; Mw 875,000

To the equipment described in Ex. 1B was prepared an identical precharge of water and sodium carbonate. The solution was heated, sparged, stirred, and the reaction carried out identically as described in Ex. 1B using the following charges: heel charge, an emulsified mixture of 173.0 gm of MMA, 0.025 gm of di-tertiary dodecyl disulfide, 0.52 gm of sodium dodecyl benzene sulfonate, and 57.15 gm of deionized water, with 0.21 gm of sodium persulfate; following the exotherm, during 3.0 hours an emulsified mixture of the same monomer composition as the heel was fed: 1557.0 g MMA, 0.225 g di-tertiary dodecyl disulfide, 4.68 g sodium dodecyl benzene sulfonate, and 367.72 g of de-ionized water. Over the same period of time, 0.66 g of sodium persulfate was fed to the reactor in 180.0 g of de-ionized water. The reactor was cooled 30 minutes after the feeds were complete. The additive was isolated by spray drying and had an average particle size of 291 nm and Mw of 875,000 daltons.

B. Preparation of a Single Layer Polymer Additive of MMA; Mw 312,000

A SLP was prepared in a manner similar to that of Example 3A, except the initial charge of de-ionized water was 1297 g, the initial monomer emulsion contained 0.173 g n-dodecyl mercaptan and the gradually-added monomer emulsion contained 1.557 g n-dodecyl mercaptan. The additive was isolated by spray drying and had an average particle size of 293 nm and Mw of 312,000.

C. Preparation of a Single Layer Polymer of MMA; Mw 88,400

A SLP was prepared in a manner similar to that of Example 3A, except the initial charge of de-ionized water was 1284.85 g, the initial monomer emulsion contained 1.384 g n-dodecyl mercaptan and the gradually-added monomer emulsion contained 12.46 g n-dodecyl mercaptan. The additive was isolated by spray drying and had an average particle size of 296 nm and Mw of 88,400.

D. Preparation of a Single Layer Polymer of MMA; Mw 35,400

A SLP was prepared in a manner similar to that of Example 3A, except the initial charge of de-ionized water was 1260.63 g, the initial monomer emulsion contained 3.81 g n-dodecyl mercaptan and the gradually-added monomer emulsion contained 34.25 g n-dodecyl mercaptan. The additive was isolated by spray drying and had an average particle size of 283 nm and Mw of 35,400.

Example 4

Preparations of Components for Craze Resistant Methacrylate Resin Blends

A. Matrix polymer emulsion: A copolymer of MMA/EA/ /96.0/4.0, of $M_w$=110,000, was prepared by emulsion polymerization with sodium persulfate initiator, n-dodecyl mercaptan chain transfer agent, t-dodecyl disulfide as stabilizer, and sodium dodecylbenzene sulfonate as emulsifier. The resulting emulsion of a methacrylate matrix resin was used directly in preparing the blend of Ex. 4C, below.

B. Impact modifier emulsion: A three-stage polymer having the following wt. ratios was prepared by the method of Owens (U.S. Pat. No. 3,793,402):

1st stage: MMA/EA/allyl methacrylate (ALMA)=33.5/ 1.4 /0.07;

2nd stage: butyl acrylate/styrene/ALMA=36.3/7.9/0.9;

3rd stage: MMA/EA=19.2/0.8. The emulsion polymerization was initiated with potassium persulfate and stabilized with potassium dodecylbenzene sulfonate. This impact modifier emulsion was prepared for direct blending in Ex. 4C, below.

C. Impact Modifier Blend

The emulsion of impact modifier 4B (84 parts on a solids basis) was blended with 10 parts of the emulsion of matrix polymer 4A and 6 parts of a high molecular weight (Mw>1, 000,000) methyl methacrylate/ethyl acrylate copolymer prepared by conventional emulsion polymerization with sodium lauryl sulfate emulsifier and sodium persulfate initiator. The resulting emulsion blend of these three emulsion components was spray-dried to produce a free-flowing powder for use as an impact modifier blend into the blends of Example 4D.

D. Preparations of Solvent Craze Resistant Blends: Solvent craze resistant formulations were prepared by dry-blending the materials from Examples 1A, 3, and 4 in the ratios shown in Table 2. The blends were melt-compounded and pelletized, and molded into Izod bars as described in Ex. 1C. These steps provided blend examples 4D-1 through 4D-4, having SLP at 15 wt. %. The Mw of the SLP increased from 35K to 875K through the D-1 to D4 series. Solvent craze resistance to isopropanol was measured at 1.5% strain on the Izod bars. A comparative example (4D) is included based on matrix resin Ex. 1A and impact modifier blend 4C alone, and contains no SLP.

The blends and test results summarized in Table 2 demonstrated that the single layer polymeric additive increased solvent resistance, even to a measurable degree with SLPs having molecular weight under 100,000 (Comparative Ex's. 4D-1 and 4D-2). However, the craze resistance was at least two-fold improved when the Mw of the SLP exceeded the Mw of the matrix polymer by more than 20%. As demonstrated, the higher the Mw of the SLP, the better improved was craze resistance of the blend, e.g. achieving >30-fold improvement in Example 4D-4. Comparative Ex. 4D, having no SLP, exhibited poor craze resistance (29 sec.) compared to craze resistance achieved in the presence of an effective SLP.

TABLE 2

Solvent Craze Resistance to Isopropyl Alcohol/Water (70/30), (strain = 1.5%)

| Example | Wt % of Ex. 1A | Wt % of Impact Modifier Blend (4C) | Single Layer Polymer Additive (Mw, 000s) | Wt % of SLP Additive | Time to craze (sec) |
|---|---|---|---|---|---|
| 4D (Comp. Ex.) | 52.38 | 47.62 | None | None | 29.0 |
| 4D-1 (Comp. Ex.) | 37.38 | 47.62 | Ex. 3D (35.4) | 15.0 | 43.0 |
| 4D-2 (Comp. Ex.) | 37.38 | 47.62 | Ex. 3C (88.4) | 15.0 | 61.0 |
| 4D-3 | 37.38 | 47.62 | Ex. 3B (312) | 15.0 | 391.0 |
| 4D-4 | 37.38 | 47.62 | Ex. 3A (875) | 15.0 | >1200 |

Example 5

Preparations of Additional Components for Craze Resistant Methacrylate Resin Blends A. Preparation of methacrylate resin: Additional methacrylate resin was prepared from a monomer mixture consisting of 96.0% by weight of MMA and 4.0% by weight of EA, by a continuous bulk polymerization process, followed by extrusion to pellets. The weight average molecular weight of the resin was 111,000.

B. Preparation of Single Layer Polymeric Additive: A duplicate preparation of Example 1B was made, as described by Ex. 1B. The particles were similarly isolated and had Mw 655,000 and particle size of 269 nm.

C. Preparation of Single Layer Polymeric Additive: A SLP was prepared in a manner similar to that of Example 1B, except that the initial charge of deionized water was 1297 g, the initial monomer emulsion contained 0.173 g of n-dodecyl mercaptan (DDM), and the gradually added monomer emulsion contained 1.557 g of DDM. The particles were similarly isolated and had Mw 259,000 and particle size of 284 nm.

D. Preparation of Single Layer Polymeric Additive: A SLP additive was prepared in a manner similar to that of Example 1B, except the initial charge of deionized water was 918.16 gm, the initial monomer emulsion contained 4.33 gm of sodium dodecyl benzene sulfonate and 91.4 gm of de-ionized water and the gradually-added monomer emulsion contained 38.93 gm of sodium dodecyl benzene sulfonate and 642.57 gm of de-ionized water. The particles were similarly isolated and had Mw 581,000 and particle size of 135 nm.

E. Preparation of Single Layer Polymeric Additive: A polymeric additive was prepared in a manner similar to that of Example 1B, except the initial charge of de-ionized water was 916.43 g, the initial monomer emulsion contained 0.173 g n-dodecyl mercaptan, 4.33 g sodium dodecyl benzene sulfonate and 91.4 g de-ionized water and the gradually-added monomer emulsion contained 1.557 g n-dodecyl mercaptan, 38.93 g sodium dodecyl benzene sulfonate and 642.57 g de-ionized water. The particles were similarly isolated and had Mw 243,000 and particle size of 154 nm.

Example 6

Preparation of Additional Craze Resistant Methacrylate Blends

A series of craze resistant formulations was prepared by dry-blending the materials from Example 5 in the ratios shown in Table 3. These blends were melt-compounded in a 2.5 cm vented, single-screw extruder at 230°–260° C. to produce pellets for injection molding. Izod bars of these Examples were molded from the pellets at 260° C. yielding the Examples (6A–6E). Strain tests on these Examples were conducted as described previously, here at a strain of 1.0% with 70/30 isopropanol/water (by wt.).

TABLE 3

Craze Resistance to Isopropyl alcohol/Water (70/30), (strain = 1.0%)

| Ex. No. | Wt. % of Ex. No. 5A | SLP Additive Ex. No. | Particle size (nm) of SLP Additive | Mw of SLP Additive | Wt. % of SLP Additive | Time to craze (sec) |
|---|---|---|---|---|---|---|
| 6A Comp. Ex. | 52.38 | None | N/A | N/A | None | 14 |
| 6B | 37.38 | 5B | 269 | 655,000 | 15.0 | 163 |
| 6C | 37.38 | 5C | 284 | 259,000 | 15.0 | 47 |
| 6D | 37.38 | 5D | 135 | 581,000 | 15.0 | 330 |
| 6E | 37.38 | 5E | 154 | 243,000 | 15.0 | 52 |

The data summarized in Table 3 demonstrated that all four additives (5B–5E) imparted solvent craze resistance to the methacrylate matrix polymer defined by Example 5A. In this series, higher molecular weight additives were demonstrated to be more effective than lower molecular weight additives, and lower particle size additives were more effective among the high molecular weight set (6B and 6D), yielding the excellent craze resistance times of greater than 10-fold over the comparative example having no SLP.

Example 7

Preparation of Additional Resins for Craze Resistant Methacrylate Resin Blends

A. Preparation of 60 MMA/40 BMA methacrylate resin: Additional methacrylate resin was prepared from a monomer mixture consisting of 60.0% MMA and 40.0% BMA, by a continuous bulk polymerization process, followed by extrusion to pellets. The resin Mw was 162,000.

B. Preparation of 80 MMA/20 BMA methacrylate resin: Additional methacrylate resin was prepared from a monomer mixture consisting of 80.0% MMA and 20.0% BMA, by a continuous bulk polymerization process, followed by extrusion to pellets. The weight average molecular weight of the resin was 163,000.

Example 8

Preparation of Additional Craze Resistant Methacrylate Blends

A series of formulations for craze resistance testing was prepared by dry-blending the resins from Example 7 with the SLP of Example 5D in the ratios shown in Table 4. These blends were melt-compounded in a 2.5 cm vented, single-screw extruder at 230°–260° C. to produce pellets for injection molding. Izod bars were molded from the pellets at 260° C. yielding Examples 8A–8D. Strain tests on these Examples were conducted as described previously, here at a strain of 1.0% with 70/30 isopropanol/water.

13

TABLE 4

Craze resistance to Isopropanol/water (70/30), (strain = 1.0%)

| Blend Example | Methacrylate resin Example No. | Wt % of SLP additive (Ex. 5D) | Seconds to craze |
| --- | --- | --- | --- |
| 8A - Comp. Example; No SLP | 7A | 0 | 6.0 |
| 8B | 7A | 15.0 | 21.0 |
| 8C - Comp. Example; No SLP | 7B | 0 | 39.0 |
| 8D - Comp. Example | 7B | 15.0 | 51.0 |

These data demonstrated that the SLP added showed some effect in improving the craze resistance of methacrylate resins containing high levels of comonomer, here 40% and 20% BMA, respectively. Thus, the 7A resin was improved more (about 3-fold) than the 7B resin (less than 2-fold) by this particular blend combination with the SLP particles of Example 5D.

Example 9

Preparation of Additional Resins for Craze Resistant Methacrylate Resin Blend Tests A. Preparation of methacrylate resin: Additional methacrylate resin was prepared from a monomer mixture consisting of 96.0% MMA and 4.0% EA, by a continuous bulk polymerization process, followed by extrusion to pellets. The Mw of the resin was 110,000.

B. Preparation of methacrylate resin: Additional methacrylate resin was prepared from a monomer mixture consisting of 97.0% MMA and 3.0% EA, by a continuous bulk polymerization process, followed by extrusion to pellets. The Mw of the resin was 198,000. The "particle" (pellet) size of this material was ca. 2.0 mm.

Comparative Example 9

Preparation of Additional Methacrylate Blends For Craze Resistance Testing

A set of formulations was prepared to test craze resistance of blends of resins having a SLP-type component of particle size exceeding 500 nm, by dry-blending 15.0 wt % of resin Example 9B with 85.0 wt % of matrix resin Example 9A. The blend was melt-compounded in a 2.5 cm vented, single-screw extruder at 230°–260° C. to produce pellets for injection molding. Izod bars of Ex. 9A and this blend were molded at 260° C. yielding Comparative Examples 9A and 9B. Strain tests on these Examples were conducted as described previously, here at a strain of 1.0% with 70/30 isopropanol/water (by wt.). The results are shown in Table 5.

TABLE 5

Craze resistance to Isopropanol/water // 70/30 (strain = 1.0%)

| Blend Example | Methacrylate resin Example No. | Wt % of Example Resin 9B | Seconds to craze |
| --- | --- | --- | --- |
| 9A - Comp. Example; No SLP | 9A | 0 | 10.0 |
| 9B - Comp. Example | 9A | 15.0 | 33.0 |

These results showed that some degree of craze resistance improvement occurred when the particle size of the higher

14 molecular weight additive was significantly larger than 500 nm, but craze resistance was far less than achieved with SLP particles having composition similar to that of Resin 9B, but having particle size <500 nm diameter (e.g. Examples 1C and 4D-3).

Example 10

Preparation of Additional Components for Craze Resistant Methacrylate Resin Blends A. Preparation of a Single Layer Polymer: A SLP of 60 MMA/40 BMA was prepared in a manner similar to that of Example 1B, except the heel charge contained 103.8 gm of MMA and 69.2 gm of BMA and the gradually added emulsified monomer mixture contained 934.2 gm of MMA and 622.8 gm of BMA. The particles were isolated similarly as those of Ex. 1B and had 694,000 and particle size of 269 nm.

B. Preparation of a Single Layer Polymer: A SLP of 80 MMA/20 BMA was prepared in a manner similar to that of Example 10A, except the heel charge contained 138.4 gm of MMA and 34.6 gm of BMA and the gradually added emulsified monomer mixture contained 1245.6 gm of MMA and 311.4 gm of BMA. The particles were similarly isolated and had 649,000 and particle size of 274 nm.

Example 11

Preparation of Additional Craze Resistant Methacrylate Blends

A series of craze resistant formulations was prepared by dry-blending the materials from Example 10 and the MMA/BMA copolymers of Examples 7A and 7B in the ratios shown in Table 6. These blends were melt-compounded in a 2.5 cm vented, single-screw extruder at 230°–260° C. to produce pellets for injection molding. Izod bars of these Examples were molded from the pellets at 260° C. yielding Examples 11A–11D. Strain tests on these Examples were conducted as described previously, here at a strain of 1.0% with 70/30 isopropanol/water (by wt.).

TABLE 6

Craze resistance to Isopropanol/water (70/30), (strain = 1.0%)

| Blend Example | Methacrylate resin Example No. | SLP Example No. | Wt % of SLP | Seconds to craze |
| --- | --- | --- | --- | --- |
| 11A - Comp. Example; No SLP | 7A | — | 0 | 6.0 |
| 11B | 7A | 10A | 15.0 | 84 |
| 11C - Comp. Example; No SLP | 7B | — | 0 | 39 |
| 11D - Comp. Ex. | 7B | 10B | 15.0 | 71 |

These data demonstrated that the 60/40//MMA/BMA matrix (7A) was more responsive to craze resistance improvement than was the 80/20//MMA/BMA matrix resin (7B). The effect of adding SLP (here, of the same copolymer composition as the matrix resin) is clear by the above results, even in blends with methacrylate resins of compositions generally poor in solvent craze resistance (due to their high BMA content). Thus, SLP particle presence with the methacrylate matrix resin showed almost 2-fold improvement of craze resistance in the 11D blend and greater than 10-fold improvement in the blend of Example 11B over the craze resistance value of the respective methacrylate matrix resins alone.

We claim:

1. A methacrylate resin blend composition, comprising:
   a) from 50 to 99 weight percent of a methacrylate matrix resin consisting essentially of polymerized monomer units comprising at least 50 weight percent methyl methacrylate and optionally up to 50 weight percent of at least one monoethylenically unsaturated monomer unit selected from the group consisting of $C_1$–$C_8$ alkyl acrylate, $C_2$–$C_4$ alkyl methacrylate, styrene, and acrylonitrile, the methacrylate matrix resin having a weight average molecular weight of at least 85,000 daltons; and
   b) from 1 to 50 weight percent of particles of a single layer polymer consisting essentially of polymerized monomer units comprising at least 50 weight percent methyl methacrylate and optionally up to 50 weight percent of at least one monoethylenically unsaturated monomer unit selected from the group consisting of $C_1$–$C_8$ alkyl acrylate, $C_2$–$C_4$ alkyl methacrylate, styrene, and acrylonitrile; the single layer polymer having a weight average molecular weight of at least 120% of the weight average molecular weight of the methacrylate matrix resin and the single layer polymer particles having a diameter of from 50 to 500 nanometers.

2. The methacrylate resin blend composition of claim 1 wherein the methacrylate matrix resin has a weight average molecular weight of from 85,000 to 120,000 daltons and the single layer polymer has a weight average molecular weight of 105,000 to 1,000,000 daltons.

3. The methacrylate resin blend composition of claim 1 wherein the single layer polymer and the methacrylate matrix resin independently consisting essentially of polymerized monomer units comprising at least 85 weight percent methyl methacrylate.

4. The methacrylate resin blend composition of claim 1 wherein the single layer polymer and the methacrylate matrix resin independently consist essentially of polymerized monomer units comprising at least 90 weight percent methyl methacrylate, and the $C_1$–$C_8$ alkyl acrylate is selected from methyl acrylate, ethyl acrylate, and butyl acrylate, and the $C_2$–$C_4$ alkyl methacrylate is butyl methacrylate.

5. The methacrylate resin blend composition of claim 1 wherein the improved solvent craze resistance of the blend is at least 2-fold greater than the craze resistance value of the methacrylate matrix resin.

6. A molded article comprising the methacrylate resin blend composition of claim 1.

7. The methacrylate resin blend composition of claim 1 further comprising particles of an acrylic multi-layer polymer.

8. The methacrylate resin blend composition of claim 7 wherein the acrylic multi-layer polymer particles comprise from 10 to 40 parts per hundred, based on the methacrylate resin blend, wherein the methacrylate resin blend comprises from 80 to 95 percent of the methacrylate matrix resin and from 5 to 20 percent of the single layer polymer.

9. A molded article comprising the methacrylate resin blend composition of claim 7.

10. A method of improving solvent craze resistance of a methacrylate matrix resin, comprising the steps of:
   a) adding, to a methacrylate matrix resin consisting essentially of polymerized monomer units of at least 50 weight percent methyl methacrylate and optionally up to 50 weight percent of at least one monoethylenically unsaturated monomer unit selected from the group consisting of $C_1$–$C_8$ alkyl acrylate, $C_2$–$C_4$ alkyl methacrylate, styrene, and acrylonitrile, the methacrylate matrix resin having a weight average molecular weight of at least 85,000 daltons, particles of a single layer polymer consisting essentially of polymerized monomer units comprising at least 50 weight percent methyl methacrylate and optionally up to 50 weight percent of at least one monoethylenically unsaturated monomer unit selected from the group consisting of $C_1$–$C_8$ alkyl acrylate, $C_2$–$C_4$ alkyl methacrylate, styrene, and acrylonitrile; the single layer polymer particles added in an amount of from 1 to 50 weight percent based on the combined weight of the methacrylate matrix resin and the single layer polymer particles, the single layer polymer having a weight average molecular weight of at least 120% of the weight average molecular weight of the methacrylate matrix resin and the particles having a diameter of from 50 to 500 nanometers; and
   b) melt blending the methacrylate matrix resin containing the added SLP particles to form a blend of the SLP particles and matrix resin, wherein the blend has a solvent craze resistance value at least twice the solvent craze resistance value of the methacrylate matrix resin.

* * * * *